May 20, 1969 R. E. GERHARDT ET AL 3,444,915
THREAD LOCKING DEVICE AND METHOD
Filed June 18, 1964 Sheet 1 of 2
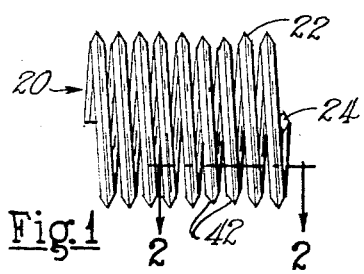
Fig. 1
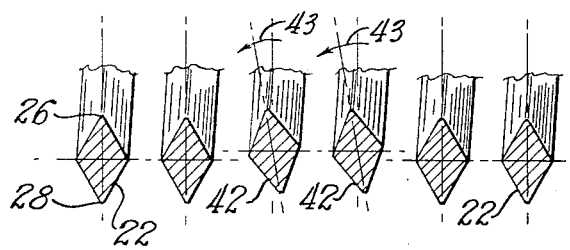
Fig. 2
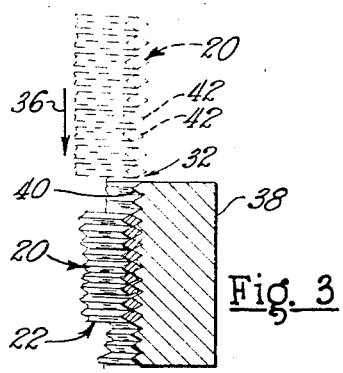
Fig. 3
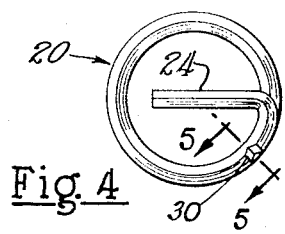
Fig. 4
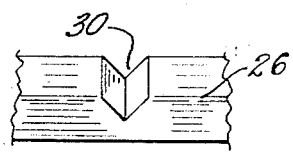
Fig. 7
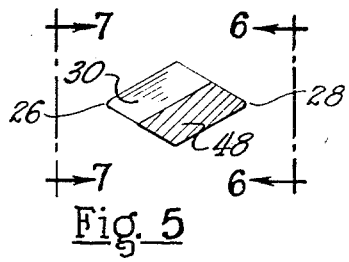
Fig. 5
Fig. 6
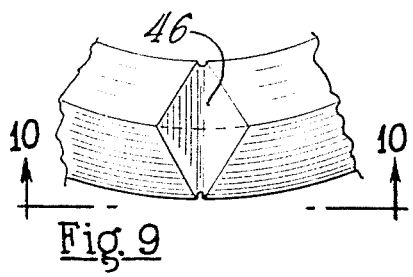
Fig. 9
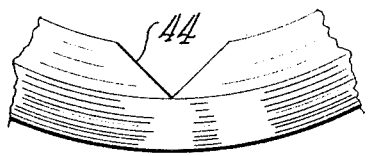
EARLY PRIOR ART
Fig. 8
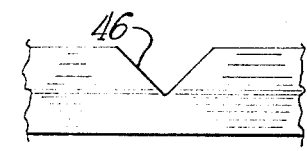
Fig. 10
LATER PRIOR ART
RICHARD E. GERHARDT &
RAYMOND L. THURSTON
INVENTORS
BY Ely, Pearne Gordon
ELY, PEARNE & GORDON
ATTORNEYS

RICHARD E. GERHARDT &
RAYMOND L. THURSTON
INVENTORS

BY

ELY, PEARNE & GORDON
ATTORNEYS

United States Patent Office 3,444,915
Patented May 20, 1969

3,444,915
THREAD LOCKING DEVICE AND METHOD
Richard E. Gerhardt and Raymond L. Thurston, Oakland County, Mich., assignors to Republic Industrial Corporation, New York, N.Y., a corporation of Delaware
Filed June 18, 1964, Ser. No. 376,143
Int. Cl. F16b *39/34, 39/28;* B21d *53/24*
U.S. Cl. 151—14                                              12 Claims This invention relates to the art of fasteners and, more particularly, to a thread protecting device in the nature of a helical wire coil insert for application between two threaded parts and to a method of producing the inserts.

THE PROBLEM

As is known, screw threaded fasteners, such as bolts, studs, screws, and the like are widely used to hold various parts in assembled relationship. These parts are often subject to vibration in use and will loosen in time unless measures are taken to lock them more securely in place.

As is also known, a bolt or other externally threaded part, when threaded into a tapped hole, does not adapt itself exactly to the mating thread of the tapped hole and thus does not evenly distribute the load over the entire thread area of both parts. The result is often thread failure.

Also, repeated installations of a bolt into a tapped hole are productive of scoring and wear on both threads. Thus, repeated installations will generally gall or score the material of both threaded parts or any plating thereon, and ultimately ruin both the tapped hole and the bolt, especially when using relatively soft materials.

In the prior art, the use of wire coil inserts for lining tapped holes to provide a hard wear surface and distribute loadings is well known. However, the prior devices have displayed disadvantages. Thus, the prior inserts of the locking type, by concentrating the binding or locking action over a limited thread area, have caused plating removal and damage to the threads.

Further, the installation-torque curve of prior locking inserts has not been good. A significant drop-off between the first and fifteenth installations, for example, is inherent in the prior art products.

Therefore, important objects of the invention are to provide a wire coil insert having improved locking characteristics and a relatively flat installation-torque curve when used for a considerable number of application and removal cycles.

A further object is to provide a locking coil insert having locking characteristics that better resist loosening by vibration than prior devices of this type, and that is, nevertheless, adapted to be quickly applied.

A further object is to provide an improved locking coil insert which distributes the locking force over a larger portion of the thread surface area, thereby reducing wear on the mating threads.

A further object is to provide a novel locking coil insert that is economical to manufacture and that is adapted for high speed, large volume production.

A still further object is to provide an improved method of manufacturing locking coil inserts.

Other objects of this invention will appear in the course of the following description of a preferred embodiment of the invention and method of making it, reference being had to the accompanying drawings forming a part of this specification, wherein like reference characters designate corresponding parts in the several views.

FIGURE 1 is a side elevational view of a preferred form of the insert of invention;

FIGURE 2 is a greatly enlarged, fragmentary cross-sectional view taken along line 2—2 of FIGURE 1;

FIGURE 3 is a composite, fragmentary, sectional view, showing in dotted outline a coil before insertion, and in solid outline, a coil after insertion into a tapped hole;

FIGURE 4 is an end elevational view of the coil of FIGURE 1;

FIGURE 5 is a sectional view taken along the line 5—5 of FIGURE 4;

FIGURE 6 is a fragmentary, side elevational view, taken along the line 6—6 of FIGURE 5;

FIGURE 7 is a fragmentary, side elevational view, taken along the line 7—7 of FIGURE 5;

FIGURE 8 is a fragmentary, end elevational view, like FIGURE 4, showing an early prior art, axially oriented break-off notch;

FIGURE 9 is a fragmentary, end elevational view, like FIGURE 8, but showing a radial break-off notch of the later prior art;

FIGURE 10 is a side elevational view taken along the line 10—10 of FIGURE 9.

Figure 11:
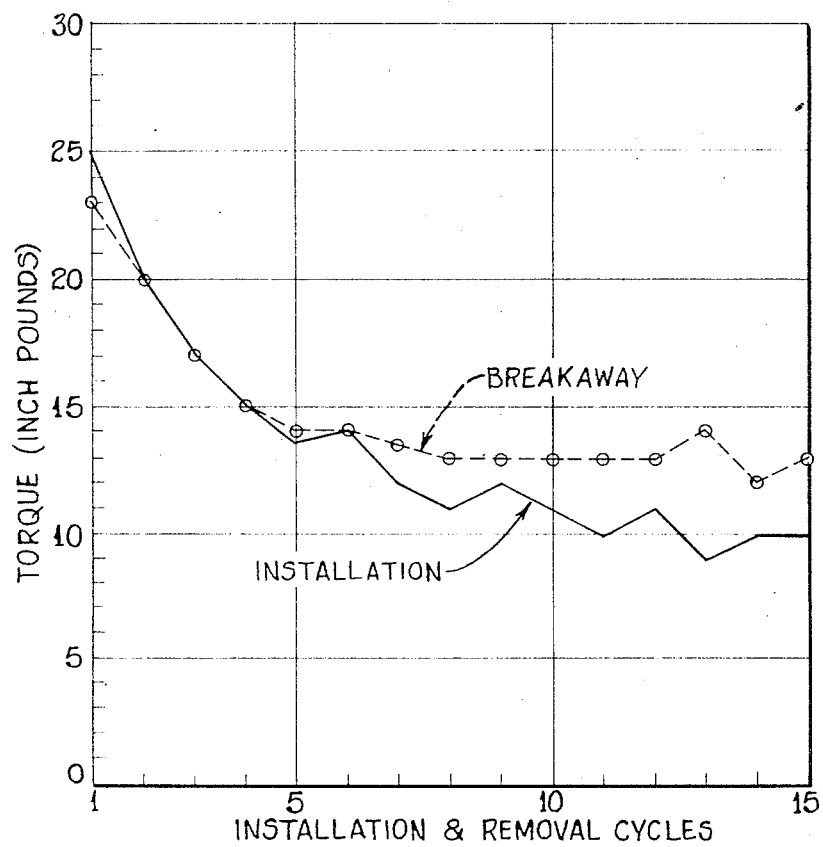
FIGURE 11 is a graphic presentation, illustrating the relatively flat installation-torque curve of a locking insert of the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

INTRODUCTORY DEFINITION OF THE INVENTION

In its broader aspects, the invention relates to an improved, self-locking, wire coil type of screw thread insert in which a selected portion of the coil is deflected or canted from the orientation of the remainder of the coil. The purpose of the deflected or canted portion is to exert a force on a threaded member turned into the coil after the coil has been first inserted into a tapped hole, as well as to exert a force on the thread of the tapped hole.

Stated in another way, the insert comprises a helically wound wire form in the shape of a cylindrical coil having a portion thereof intermediate its ends deflected or canted from the orientation of the remainder of the coil.

Further, the insert of the present invention includes an application tang extended diametrically at one end of the coil and including a break-off notch, whereby such tang can be broken off from the rest of the coil to provide free axial entry of a threaded body into the insert after the insert is positioned within a tapped hole.

As shown in FIGURE 1, the reference numeral 20 designates a coil of the invention, shown in substantial entirety. This comprises a plurality of turns 22 that progress axially along the coil 20 in a continuous helical pattern or path.

At the right end of FIGURE 1, as shown in more detail in FIGURE 4, a break-off tang extends diametrically of the unit. The purpose of this break-off tang 24, which, incidentally, is preferably slightly shorter than the inside diameter of the coil 20, is for inserting the coil into a tapped hole. A rodlike driver with a diametrically-extending notch across an end face is placed into the coil, from the left side of FIGURE 1, to embrace the break-off tang 24. When the driver is rotated, it turns the coil by gripping tang 24. This is effective to run the coil into a tapped hole.

Following application of the coil 20 into an appropriate tapped hole, the tang 24 is broken off so as not to interfere with a threaded screw or bolt when the latter is run into the coil for holding and locking purposes. As shown in FIGURE 4, a notch 30 is provided so that the tang 24 can be broken off after the coil is inserted.

From FIGURE 2, it will be noted that the wire from which the coil 20 is made has a non-circular cross-section that, in the particular embodiment illustrated, is a polygon having two pairs of sides that respectively converge generally radially inwardly and generally radially outwardly. This cross-section is preferably of a substantially diamond-shape, and may be more specifically defined as composed of two isosceles triangles placed base-to-base, with the opposite corners 26 and 28 of the two triangles slightly rounded off or truncated.

THE DEFLECTED COIL FEATURE OF THE INVENTION

An important feature of the present invention is its improved locking power, whereby it meets all federal and military specifications for this type of product. In this regard, an important structural distinction exists between the coil of the present invention and the ordinary, helical, wire coil inserts heretofore known and used. This distinction involves the deflection or canting of a portion of the coil during its manufacture.

In FIGURES 1 and 2, this distinction is manifested by two deflected or canted convolutions 42. These are preferably positioned near, but spaced from the lead end of the unit at which the break-off tang 24 is located.

Also, as shown in FIGURE 2, the deflected coils have a slightly smaller diameter than the remainder of the coils. This smaller diameter prevents the deflected coils from being reoriented when inserted in the female threaded member. Thus, the predetermined coil deflection is maintained after installation of the insert into the tapped hole.

The amount of deflection or twist from normal orientation is indicated by the spaced lines traversed by the arrows 43 of FIGURE 2.

The present state of development of this invention indicates that a relatively broad range of deflection or cant can be accommodated in the deflected coil portion. The exact amount of deflection will depend upon the particular use; that is, the size of bolt and nut or other threaded parts involved and the foot pounds of torque required for a given application. Generally, the amount of deflection will be within the range of about 10–30°. Preferably, the minimum deflection is at least about 12° and the maximum preferably does not exceed about 25°. If the deflection is insufficient, added gripping power will not be present, of course. If the deflection is unduly exaggerated, improper threading and galling will result. Therefore, reasonable judgment within the specified broad limits is to be exercised in the use of the invention.

In general, the angle of deflection and the number of deflected coils will vary according to thread size in order to effect the best relationship for desired, consistent torque values.

It should be noted that there is a lead-in portion and a lead-out portion at the ends of the deflected coil or coils. The lead-in and lead-out portions are progressively deflected to lead in and out of the fully deflected orientation. These portions will usually comprise about one-fourth turn each, although considerable variation in this relationship is permissible.

MODE OF OPERATION

In effect, the deflected portion of the coil, represented by reference numeral 42 in FIGURES 1 and 2, has the effect of bearing with substantially increased friction against the threads of a threaded body turned into the insert and against the threads of the tapped hole. The threaded body turned into the insert tends to reorient the deflected portion of the coil and force it to conform to the thread contour of the tapped hole as well as to the thread contour on the outside of the male member. A very effective frictional lock is thus provided because the reoriented portion of the coil is elastically stressed in opposition to its tendency to return to its deflected condition, and the induced stress causes increased binding of the insert with both the internally threaded piece and the externally threaded piece with a dual locking action and with substantial holding force.

When the male member is removed, the elastic resilience of the metal of which the coil insert is formed causes the deflected portion of the coil to spring back to its original deflected condition. Thus, the improved locking power remains and is evidenced again when the parts are reassembled.

SUMMARY RE DEFLECTED COIL FEATURE

In its preferred form, the present invention may be defined as including a coil portion, ranging from part of a single turn to one or more entire turns that are deflected both from the normal path and normal orientation of the remainder of the coil, the deflection from normal orientation being a twisting rotation of the coil wire about a line that is substantially the axis of the wire itself, and may be termed the mean helical path of the wire, and the deflection from the normal path being a change in diameter of the deflected portion of the coil relative to the remainder of the coil. The locking effect is developed principally from the resistance to reverse twisting of the deflected portion of the coil. Expressed in other terms, the inherent torsional stiffness of the deflected coil produces a frictional binding effect at the bearing surfaces of both the internal thread and the external thread between which the coil is disposed.

The broad scope of the invention is meant to encompass a coil insert wherein a portion thereof has been deflected from the normal path and/or the normal orientation of the remainder of the coil so that, when threading the male member into the coil seated in the female member, substantial forces between both members and the coil are created in causing the deflected portion of the coil to conform to the remainer of the coil.

From the above it will be evident that the effect is to not only hold the threaded male member securely in position, but also to hold the thread-like coil insert firmly seated in the internally threaded hole in which it is initially placed. Nevertheless, the units can be separated when necessary, as for disassembly, repair, or maintenance of the components to which the invention is applied, and can then be reassembled to again obtain the original mode of operation and operational characteristics.

OTHER PHYSICAL ASPECTS OF THE INSERT OF INVENTION

As shown in FIGURE 3 of the drawings, the outside diameter of the insert of the invention, in its free state, is slightly larger than the diameter of the tapped hole into which it is inserted. The slightly greater diameter of the coil is indicated in FIGURE 3 at the point designated by the arrow 32, where the relative diameters of the tapped hole and of the coil before insertion (shown in phantom outline) may be visually compared. The arrow 36 indicates the direction in which the coil 20 is run into a tapped hole in a body 38 which is thereafter to receive a threaded bolt, stud, or the like. This insures a firm frictional retention of the insert 20 in the thread 40 or a tapped hole before a bolt or similar threaded body is inserted. The slightly enlarged diameter of the coil is conventional and contributes to a positive seating of the insert before the male member is threaded into the tapped hole.

In the extended scope of invention, it is to be understood that, though a unitary coil structure is preferred from an economic as well as a convenience point of view, the structure could comprise a composite of individual coil portions with at least one portion of major length having a so-called normal configuration or orientation of its convolutions and a locking or gripping portion of different or so-called deflected or canted configuration. The gripping portion is usually a minor portion of the total coil length. Since, in the invention as first described above, the deflected or canted portion of a unitary coil is preferably located intermediate the ends of the coil, it would therefore follow that, in a composite structure, a three component unit would preferably comprise end coils of a so-called normal configuration with a separate, deflected coil structure therebetween.

REPRESENTATIVE EXAMPLES AND DIMENSIONS

Some actual examples within the scope of the invention are hereafter set forth.

Example 1

Utilizing a number 4–40 thread, the minor diameter of the locking coil of the invention will not exceed about one-tenth inch. Usually a minimum of about one-half turn of a coil of this size will be fully canted through an angle of 13 to 17 degrees, and about one-fourth turn at each end of the fully deflected portion will be progressively deflected to lead into and out of the fully deflected portion. Thus, the total deflected portion will comprise approximately one complete turn with 13 to 17 degrees of maximum deflection.

Example 2

Using a 5/16"–24 thread, a minimum of about two turns of deflected coil with one-quarter turn for lead-in and one-quarter turn for lead-out provides a locking force sufficient to meet military and government specifications. This unit would have about 15–20 degrees of maximum deflection.

In general, in order to meet current military and government specifications, the total length of the coil ranges from about one to about three times the diameter of the insert. This will be determined in a more specific way by the amount of effective thread engagement required to carry the load to be resisted.

An important feature of the present invention is the relatively flat installation-torque curve displayed by the locking insert when tested for fifteen cycles according to Military Specification MIL–I–8846. The torque drop from the first to the fifteenth installation and removal is illustrated in FIGURE 11 and is significantly less than with other known coil inserts of this general type.

THE BREAK-OFF TANG

The break-off tang and notch have been referred to above and are shown clearly in FIGURES 4–7. Prior art break-off notches are illustrated in FIGURES 8, 9, and 10.

The following factors are important to the appropriate functioning of the application tang:

(a) Orientation of the break-off notch 30 so that it will permit removal of the tang 24 by the application of an axial force rather than a torsional force; and (b) Orientation of the break-off notch to provide a break that is clean and free of burrs that might score or damage the external thread of the part that is run into the applied insert.

An earlier location of the break-off notch is shown in FIGURE 8 of the drawings, the notch running axially of the coil and being positioned on the inside of the end convolution, designated 44. This prior structure required that the torque for applying the insert be reversed or alternated in direction a few times to provide a break at the notch 44. This alternation of the direction of the torque frequently caused a displacement of the coil from its originally seated position in the course of or at the moment of breaking off the tang. Also, formation of the inside notch is difficult and requires great care in order to avoid damage to the other coil convolutions. This is readily apparent when it is noted (FIGURE 1) that the end coil to be notched lies closely adjacent the next coil, which may be accidentally notched if the notching machinery is not precisely adjusted.

A step forward in the art is represented by FIGURES 9 and 10 wherein the break-off notch is designated 46. In this case, the notch was truly radial, instead of axial as in FIGURE 8. Some refinements were involved in the development of FIGURES 9 and 10 as to the specific location of the bottom of the notch, etc.; but these are not here material. The notch location shown in FIGURES 9 and 10 had the advantages that the notch could be more easily formed without damage to other coils. However, this required great care to avoid damage to adjacent coils. This caused relatively slow production.

According to the present invention, as shown in FIGURES 4, 5, 6, and 7, the notch 30 has a novel orientation parallel to an exposed, outside face of the end convolution. This orientation affords greater ease and access to notching.

The notch 30 is a V-shaped notch which extends into the wire from one radially outer face to a radially inner face thereof. The notch depth is preferably about ½ the thickness of the wire measured from one radially inner face to an opposite radially outer face thereof. This thickness permits the tang 24 to be broken off by the application of an axial force and also provides a break that is clean and free of burrs that might gall or damage the external thread of the part that is run into the applied insert.

THE METHOD OF INVENTION

The coil inserts of the invention are suitably made on a conventional wire coil, torsion spring winding machine. This is effected by modifying the arbor of the machine. Additionally, a mechanism is used for canting the wire guide to a predetermined angle at the time the wire meets the deflected coils on the arbor. This is done by cams timed with the gear which rotates the arbor.

Essentially, a continuous helical coil form is developed, orienting the convolution or turns of the coil so that opposed corners or apices of the diamond-shaped cross-section of the wire are substantially in a plane normal to the central axis of the coil. While a wire form of diamond-shaped cross-section is preferred, other forms may be used.

During the winding or coiling of the coil, at least a part of the coil is deflected out of the normal orientation of the remaining turns of the coil. This includes both angular deflection and diameter reduction. In this connection, although a distinction is sometimes made between coiling and winding, the two operations are equivalents as far as the present invention is concerned and the term winding is used generically in its broad sense in the appended claims.

While the presently preferred form of the invention and method of making it have been disclosed in detail, variations thereof will thereby be suggested to those skilled in the art. Accordingly, the invention is not intended to be limited to the details disclosed, except as required by the appended claims.

We claim:

1. In a wire coil screw thread insert having a plurality of convolutions of helical form extending between opposite ends of the coil, the wire being of generally diamond-shaped cross-section, the improvement wherein over at least a portion of a convolution of the coil all portions of cross sections of the wire are deflected in a single direction beyond their elastic limit relative to the orientation of the wire over the remainder of the convolution so that the twisted portion has a permanent set and so that each twisted convolution has a cross-section wherein two opposed apices of the wire are displaced axially of the coil relative to each other and relative to the corresponding apices of the cross-section of the wire over the remainder of the convolutions of the coil, the deflected portion of the coil comprising a lead-in deflected portion, a fully deflected portion, and a lead-out deflected portion, said lead-in and lead-out portions being defined by surfaces which progressively blend from non-deflected portions of the coil to said deflected portion.

2. A wire coil screw thread insert according to claim 1 wherein the deflected portion of the wire is wound on a smaller radius than the remainder of the convolutions so that the deflected portion has a substantially smaller outer and inner diameter than the remaining convolutions.

3. A wire coil screw thread insert according to claim 1 wherein the fully deflected portion is deflected within the range of between 10° and 30°.

4. A wire coil screw thread insert according to claim 3 wherein the deflected portion is wound on a smaller radius than the remainder of the convolutions and has a substantially smaller outer and inner diameter than the remaining convolutions.

5. A wire coil screw thread insert according to claim 1 wherein the fully deflected portion is deflected in the range of 12° to 25°.

6. A wire coil screw thread insert according to claim 5 wherein the deflected portion of the wire is wound on a smaller radius than the remainder of the convolutions and has a substantially smaller outer and inner diameter than the remaining convolutions.

7. A wire coil screw thread insert according to claim 1 wherein said lead-in and lead-out portions of the wire continue over substantially one quarter of a convolution of the coil.

8. A wire coil screw thread insert according to claim 1 wherein the fully deflected portion extends over at least one quarter of a convolution of the coil.

9. A wire coil screw thread insert according to claim 7 wherein said fully deflected portion extends over at least one quarter of a convolution of the coil.

10. In a method of producing a locking coil insert by winding a wire of non-circular cross-section to form a plurality of convolutions of a helical coil between opposite ends of the coil, the improvement comprising orienting a portion of said convolutions relative to a helical reference line running substantially centrally through the cross-section of the wire along its length, and during the winding, twisting the remainder of said convolutions about said reference line by rotating all portions of the non-circular cross-section of the wire forming the remainder of said convolutions about said reference line in a single direction so as to deflect the orientation thereof in the coil relative to said portion of said convolutions, said orienting and twisting steps deforming the wire past its elastic limit so that the wire attains a permanent set in said portion and in the remainder of said convolutions, said twisting step providing a deflected portion of the coil which comprises a lead-in deflected portion, a fully deflected portion being deflected in a single direction, and a lead-out deflected portion, said lead-in and lead-out portions comprising surfaces which progressively blend from non-deflected portions of the coil to said deflected portions.

11. In a wire coil screw thread insert having a plurality of convolutions of helical form extending between opposite ends of the coil and having a generally diametrically directed tang at one end of the coil, an end convolution of the coil adjacent said tang being notched to facilitate breaking off the tang, the wire being of generally diamond shape in cross-section with one pair of opposed apices in said end convolution oriented in a plane generally transverse to the axis of the coil and the other pair of opposed apices lying substantially in a cylinder concentric with the coil, the improvement wherein said notch extends into the wire from one radially outer face thereof relative to said cylinder, the bottom of the notch being substantially parallel to said one radially outer face and extending from another radially inner face of the wire to an opposite outer face thereof, the depth of the notch being substantially ½ the thickness of the wire measured from said one radially inner face to an opposite radially outer face thereof.

12. In a wire coil screw thread insert having a plurality of convolutions of helical form extending between opposite ends of the coil and having a generally diametrically directed tang at one end thereof, an end convolution of the coil being notched to facilitate breaking off the tang, the wire being of generally diamond shape in cross-section with one pair of opposed apices in said end convolution oriented in a plane generally transverse to the axis of the coil and the other pair of opposed apices lying substantially in a cylinder concentric with the coil, the improvement wherein said notch is V-shaped and extends into the wire from one radially outer face thereof relative to said cylinder, the bottom of the notch being substantially parallel to said one radially outer face and extending from another radially inner face of the wire to an opposite radially outer face thereof, the depth of the notch being substantially one-half the thickness of the wire measured from said one radially inner face to an opposite radially outer face thereof.

References Cited

UNITED STATES PATENTS

| 2,672,070 | 3/1954 | Forster | 85—32 |
| 2,788,045 | 4/1957 | Rosan | 151—22 |
| 2,354,810 | 8/1944 | Haas et al. | 85—46 |
| 2,363,663 | 11/1944 | Findley | 85—46 |
| 2,464,808 | 3/1949 | Hattan | 151—14 |
| 2,607,259 | 8/1952 | Forster | 85—32 |
| 2,886,088 | 5/1959 | Brancato | 151—22 |

FOREIGN PATENTS

| 1,846,852 | 2/1962 | Germany. |
| 595,082 | 11/1947 | Great Britain. |

CARL W. TOMLIN, *Primary Examiner.*

R. S. BRITTS, *Assistant Examiner.*

U.S. Cl. X.R.

10—86; 151—22